United States Patent [19]

Nemoto

[11] Patent Number: 4,648,286
[45] Date of Patent: Mar. 10, 1987

[54] BALL-RETAINING STRUCTURE IN A POWER TRANSMISSION APPARATUS

[75] Inventor: Isao Nemoto, Narashino, Japan

[73] Assignee: Nemoto Kikaku Kogyo Co., Ltd., Chiba, Japan

[21] Appl. No.: 708,424

[22] Filed: Mar. 5, 1985

[30] Foreign Application Priority Data

May 28, 1984 [JP] Japan .............................. 59-78265[U]

[51] Int. Cl.$^4$ .......................... F16H 1/16; F16H 55/10
[52] U.S. Cl. ........................................ 74/425; 74/458; 74/464; 74/DIG. 4
[58] Field of Search ................ 74/425, 457, 458, 464, 74/465, 210, 216.3, DIG. 4

[56] References Cited

U.S. PATENT DOCUMENTS

| 2,539,090 | 1/1951 | Lelanp ............................. 74/DIG. 4 |
| 2,635,483 | 4/1953 | Welsh ............................. 74/DIG. 4 |
| 3,059,408 | 10/1962 | Hippe et al. ........................... 74/210 |
| 3,142,953 | 8/1964 | Gassner et al. ....................... 74/210 |
| 3,208,296 | 9/1965 | Baermann ............................ 74/210 |
| 3,864,587 | 2/1975 | Laudry ........................... 74/DIG. 4 |
| 4,008,563 | 2/1977 | Gassner et al. ....................... 74/210 |
| 4,022,069 | 5/1977 | Boyer ................................. 74/126 |
| 4,196,639 | 4/1980 | Spodig ........................... 74/DIG. 4 |
| 4,534,577 | 8/1985 | Howard .......................... 74/388 PS |

FOREIGN PATENT DOCUMENTS

| 500269 | 1/1951 | Belgium ............................. 74/464 |
| 0083748 | 5/1982 | Japan ................................. 74/464 |
| 0211052 | 12/1983 | Japan ................................. 74/425 |
| 2115902 | 9/1983 | United Kingdom ................ 74/465 |
| 0838207 | 6/1981 | U.S.S.R. ............................. 74/465 |

Primary Examiner—Lawrence Staab
Attorney, Agent, or Firm—Young & Thompson

[57] ABSTRACT

A ball-retaining structure in a power transmission apparatus for transmitting power by means of magnetic balls arranged between non-magnetic rotating bodies is disclosed, in which a magnet or magnets are arranged within either one of the rotating bodies in the vicinity of the balls.

3 Claims, 2 Drawing Figures

BALL-RETAINING STRUCTURE IN A POWER TRANSMISSION APPARATUS

FIELD OF THE INVENTION

This invention relates to a ball-retaining structure useful in a power transmission apparatus for transmitting a power by means of magnetic balls, such as iron balls, arranged between an input rotating body and an output rotating body of non-magnetic material, which structure is simple in construction and prevents the balls from slipping off the rotating bodies.

BACKGROUND OF THE INVENTION

Heretofore, a power transmission apparatus has been commercially available, which utilizes a worm and a worm wheel as the rotating bodies, while the worm wheel is formed in a disc shape, on the circumference of which at its toothed positions are arranged rotatably a plurality of balls for reducing friction loss during engagement.

In such power transmission apparatus, the balls in the engaged phase never slip off but in the disengaged phase readily slip off. In order to avoid such slipping off and to retain the balls rotatably, therefore, a variety of ball-retaining structures has been proposed, for example a structure having arranged balls rotatably embedded more than halfway thereinto, or a structure having an outer annular ring covering the disc circumference with the balls except for the engaged areas in order to prevent the slipping-off of the balls. However, the former structure has the disadvantage of complicated and time-consuming production, while the latter has the problem of very difficult arrangement and adjustment of the outer annular ring at the minimum clearance or gap for preventing the balls from slipping off therethrough. Namely, the outer annular ring must be partially cut out to cover only the non-engaging area, but the partially cutout ring must be arranged as close as possible to the engaged area, which arrangement requires a difficult adjustment.

Accordingly, an object of the invention is to provide a ball-retaining structure of very simple construction but capable of preventing balls from slipping off.

SUMMARY OF THE INVENTION

In order to achieve the above object, the invention provides a ball-retaining structure in a power transmission apparatus for transmitting power by means of magnetic balls, such as iron balls, arranged between an input rotating body and an output rotating body of non-magnetic material, characterized in that a magnetic means is arranged within either one of the rotating bodies in the vicinity of the balls.

The invention will be described hereinbelow in more detail for its preferred embodiments with reference to the accompanying drawings.

PREFERRED EMBODIMENTS OF THE INVENTION

Figure 1:
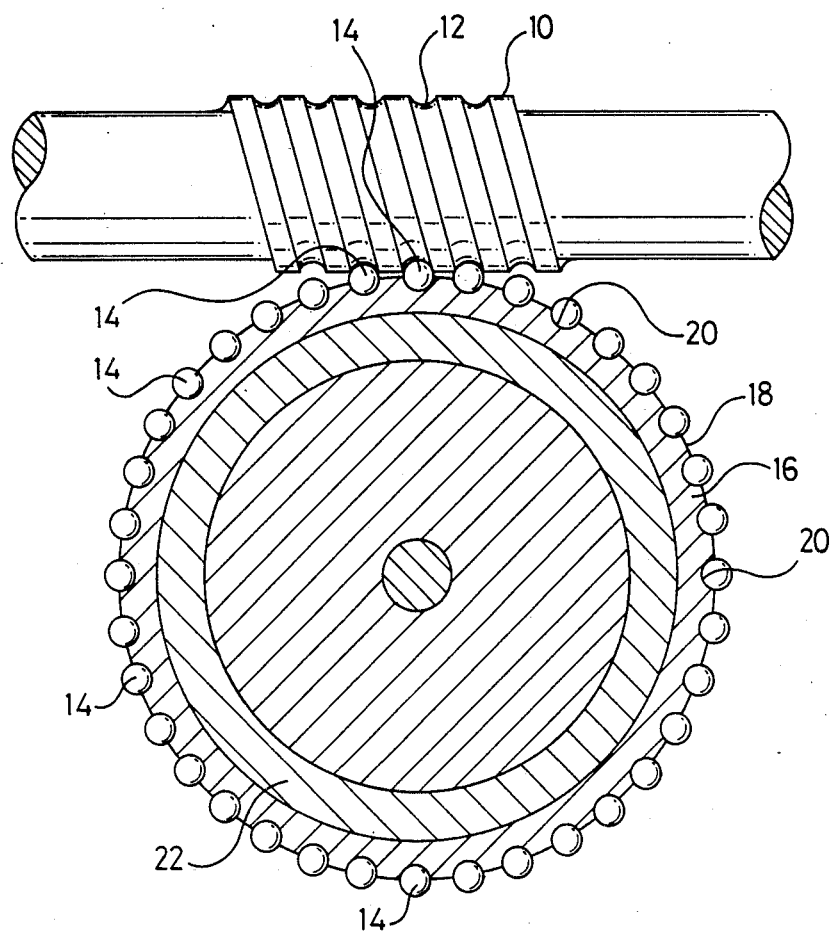
FIG. 1 is a sectional view of one embodiment of the ball-retaining structure according to the invention.

In the Figures, 10 represents a worm of non-magnetic material as an input rotating body, each helical groove 12 of which has a substantially half-circular cross-section in order to mesh with magnetic balls 14, such as iron balls.

16 represents, on the other hand, a worm wheel 16 in the form of a non-magnetic disc as an output rotating body corresponding to the worm 10, on the circumference 18 of which are formed grooves 20 of a substantially half circular cross-section having the same pitch as the grooves 12 of the worm 10 for meshing with the balls 14 similarly. The worm wheel 16 is provided coaxially therein with an annular magnet 22 having a radius slightly less than the distance between the bottom of the groove 20 and the center of the worm wheel 16.

The grooves 20 are provided therein with a series of the balls 14, through which the worm 10 and the worm wheel 16 are interconnected. In this case, the balls 14 arranged in the grooves 20 of the wheel 16 are attracted by the magnetic force of the magnet 22 and prevented from slipping out of the grooves 20, and so are retained therein rotatably. Thus, power may be transmitted with very little friction loss between the worm 10 and the worm wheel 16.

Figure 2:
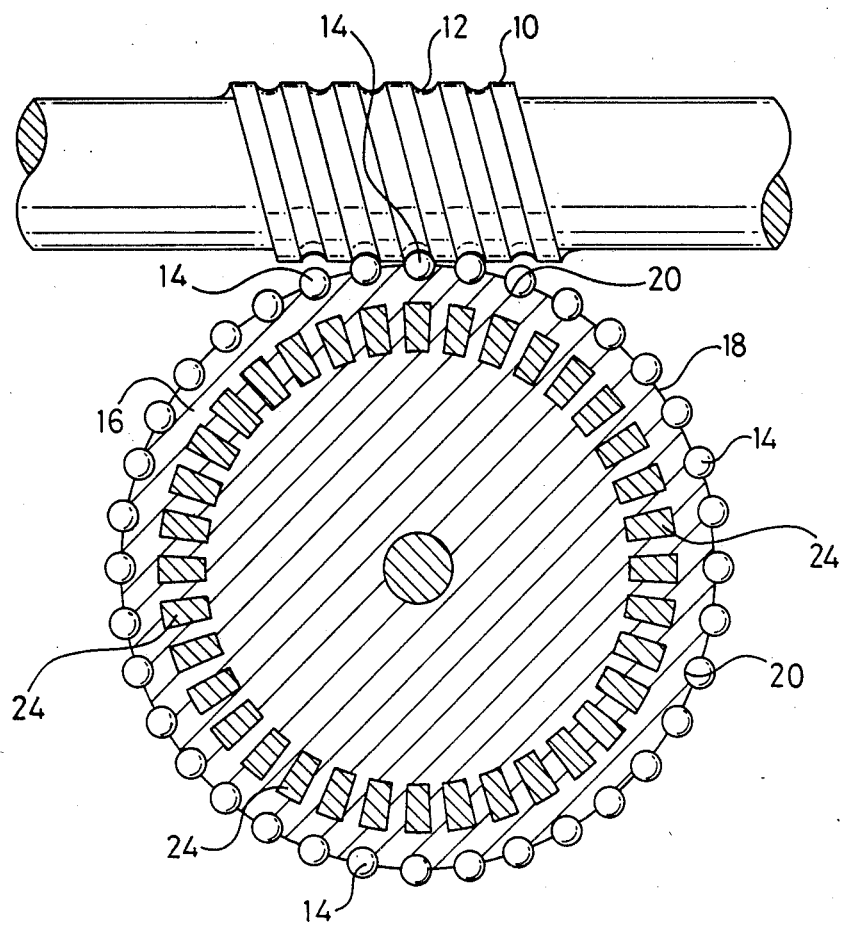
FIG. 2 is a sectional view of another embodiment of the structure according to the invention.

In another embodiment, as shown in FIG. 2, a plurality of magnetic blocks 24 may be embedded within the worm wheel 16 at positions corresponding to the grooves 20 and slightly radially inward from the grooves 20, in place of the integral annular magnet ring 22, for achieving the same effect.

The groove 12 and the groove 20 may have such a cross-section as to provide a two-point contact with the ball 14 in order to prevent displacement of the latter. Furthermore, the invention is not limited to the above arrangement of the worm 10 and worm wheel 16 but may be applied to any type of the power transmission apparatus, provided that power is transmitted through the balls 14. It will be appreciated, of course, that the magnet(s) 22, 24 may be arranged either in the input rotating body or in the output rotating body.

As described hereinabove, in accordance with the invention, the power transmission apparatus for transmitting power by means of the magnetic balls 14 is provided in either rotating body with the magnet(s) 22, 24 in the vicinity of the balls 14, so that the magnetic balls 14 may be attracted and retained on the rotating body by the magnetic force of the magnet(s) 22, 24 thereby to be prevented from slipping off and to ensure free rotation of the balls 14 because the balls 14 are retained only by the magnetic force. Thus, the structure according to the invention having a simple arrangement of the magnet 22, 24 may be manufactured at a very much lower cost than the complicated structure in the prior art.

Although the invention has been described hereinabove with reference to the preferred embodiments, many variations and modifications may be made without departing from the spirit and scope of the invention.

What is claimed is:

1. A ball-retaining structure in a power transmission apparatus for transmitting a power by means of magnetic balls, such as iron balls, arranged between an input rotating body and an output rotating body of non-magnetic material, the input rotating body being a worm and the output rotating body being a worm wheel, and magnetic means is arranged within said worm wheel to retain said balls on said worm wheel.

2. A ball-retaining structure according to claim 1, wherein the magnetic means comprises a single annular magnet arranged coaxially within the worm wheel.

3. A ball-retaining structure according to claim 1, wherein the magnetic means comprises a plurality of magnet blocks arranged within the worm wheel in positions corresponding to the balls.

* * * * *